Nov. 13, 1945.    H. E. DAVIDSON    2,389,031
BRAKING DEVICE
Filed May 6, 1944    2 Sheets-Sheet 2
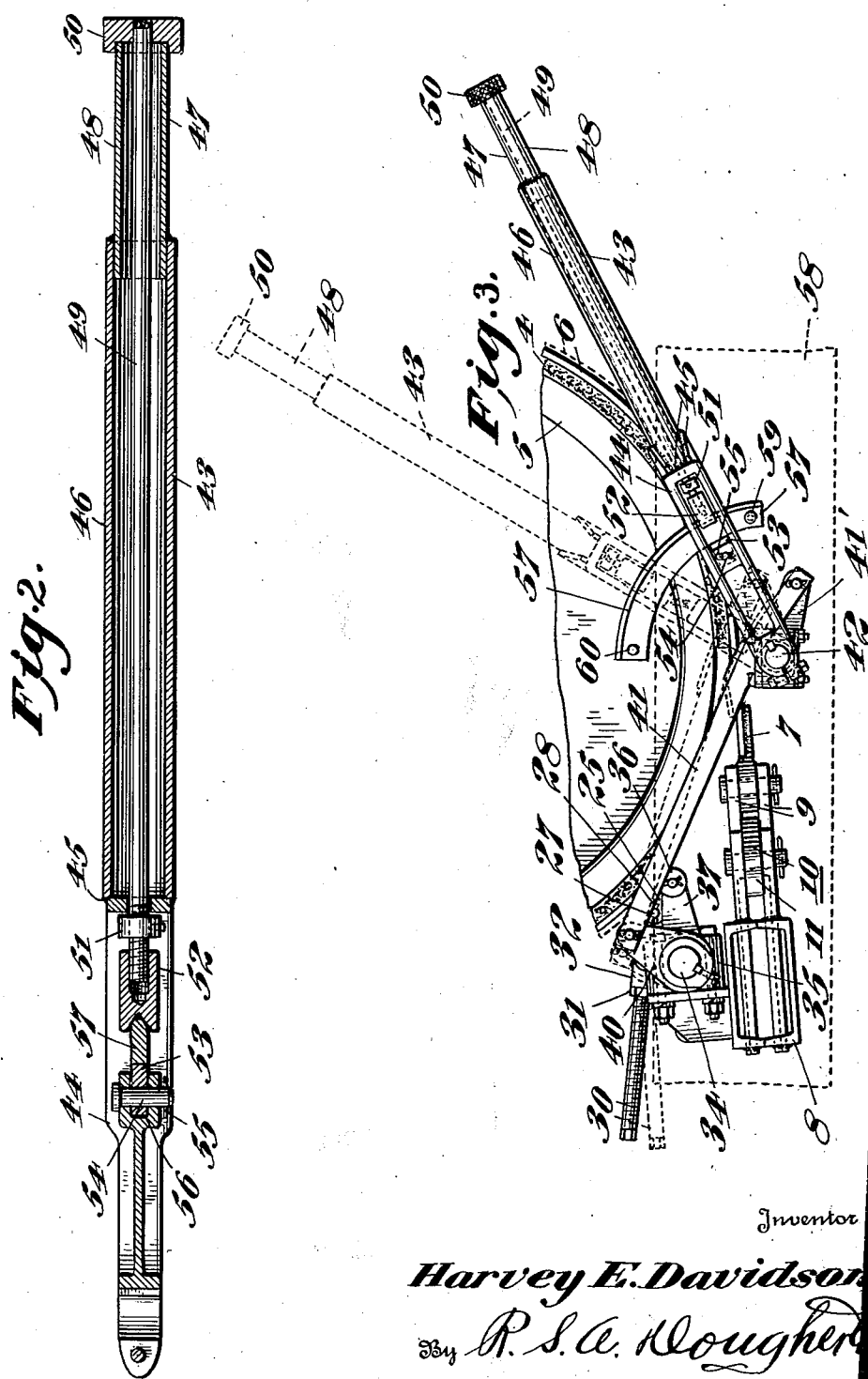
Inventor
*Harvey E. Davidson*
By *R. S. A. Dougher*
Attorney Patented Nov. 13, 1945

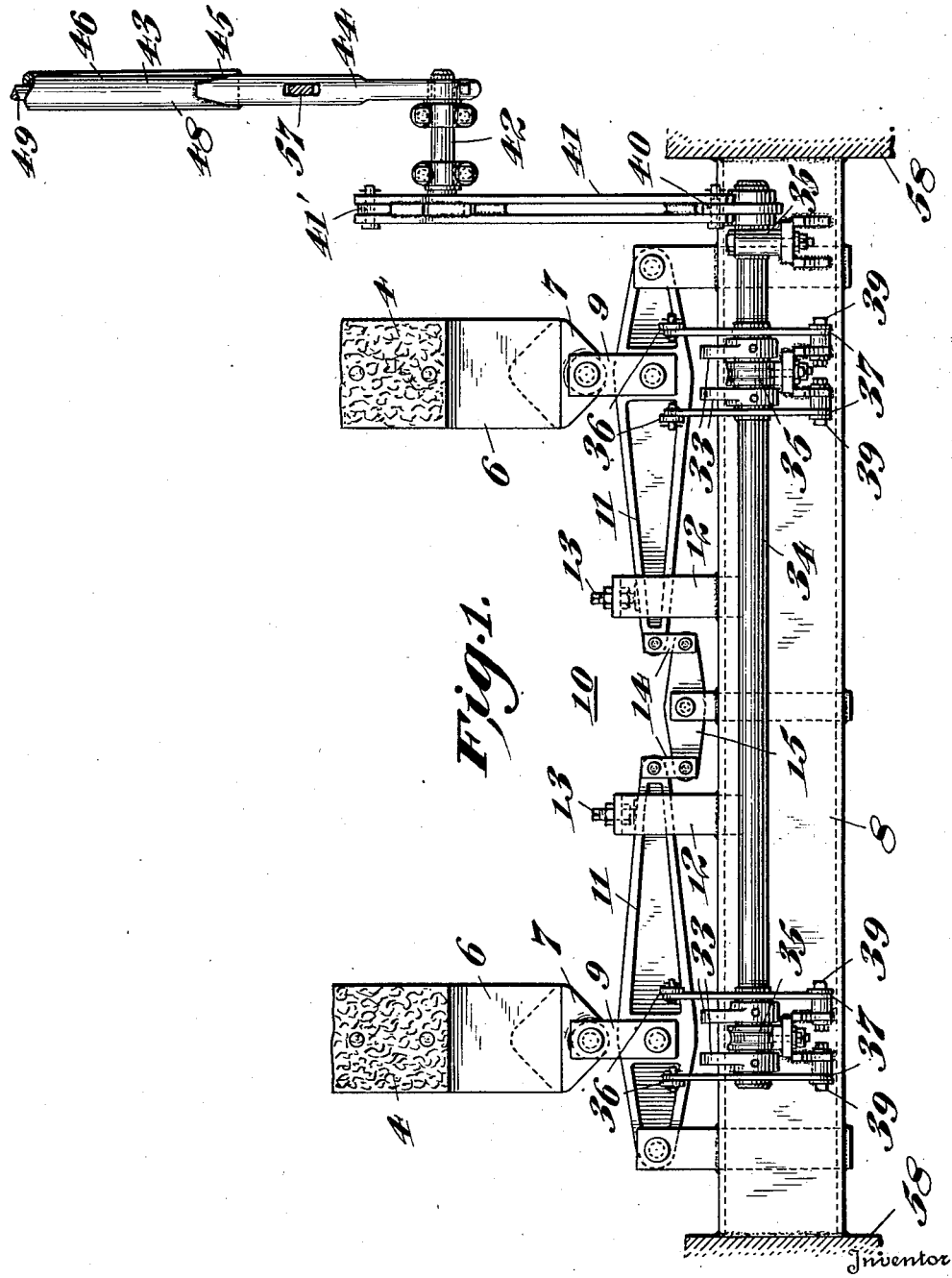

2,389,031

UNITED STATES PATENT OFFICE 2,389,031

BRAKING DEVICE

Harvey Ellis Davidson, Tulsa, Okla., assignor to Bethlehem Steel Company, a corporation of Pennsylvania Application May 6, 1944, Serial No. 534,508

6 Claims. (Cl. 74—531)

My invention relates in general to an improved braking device and more particularly to a brake lever clamp and quadrant for hoisting or similar machinery which will hold large loads dependably and may be preset.

Servicing hoists such as are used in oil fields are designed to lift loads of many tons of tubing or the like with a strong steel cable which winds onto a cable drum rotated by an engine or motor of conventional type. When it is desired to stop the lift and hold the load, powerful brakes, which for safety are usually in pairs, are applied to the brake rims on the cable drum by a manually operated brake lever.

To lock the brakes so that the load may be held in a given position for any length of time, it is generally necessary to hold the brake lever down by some such method as tying a weight to the end of the handle, hooking a chain from the handle to the hoist frame, or engaging a ratchet-and-dog latch with a notched quadrant. The first two methods are makeshifts and unsafe, while the last method becomes unsafe if the ratchet teeth or the latch dogs are worn.

During some operations, it is also desirable to be able to set the brake so that the drum will rotate slowly and lower the load, and to stop the load momentarily and then resume the same rate of lowering. With usual types of brake levers this is practically impossible.

One object of this invention, therefore, is to provide a safe and positive braking control which is not susceptible to accidental release.

Another object is a brake lever which will reliably hold self-energizing brakes and on release will return automatically to a predetermined setting.

Other objects and purposes of my invention will appear hereinafter in the specification and in the appended claims.

Having thus described briefly the advantages of the invention, I shall now in order to make the same more clear refer to the annexed two sheets of drawings, in which like characters of reference will designate like parts:

Figure 1 is a plan view of my brake lever in a brake assembly;

Fig. 2 is a vertical transverse section of the brake lever; and

Fig. 3 is a side elevation of the lower portion of the brake assembly, showing the brake lever in place.

Referring now to the drawings, the brake linings 4 are held to the brake rim 5 by the brake bands 6, which are anchored by the end grips 7 to the brake beam 8 through main links 9 and equalizing mechanism 10. Said load equalizing mechanism 10 comprises the levers 11 mounted for oscillation in the bearing brackets 12, adjustable by set-screws 13, and connected by equalizer links 14 to the centrally pivoting equalizer bar 15.

The operating ends of the brake bands 6 are provided with attached lugs 25, in which a pivot block rocks on the pin 27 held by cotter pin 28. The adjusting screw 30 having the lock nut 31 is threaded through the yoke 32 having trunnion projections pivoting on the arms 33 keyed to the brake shaft 34 journaled in bearings 35. Rollers 36 on stop arm 37 mounted on brake shaft 34 and provided with curved slot 38 and guide bolt 39 limit the movement of the brake band 6.

The brake shaft 34 is actuated by the arm 40, the link 41 connected to an arm 41' on the rocker shaft 42, and the brake lever 43. Said brake lever 43 comprises the centrally slotted lower casting 44, split at the bottom and bolted and keyed to the rocker shaft 42, and welded at the top 45 to the welded telescoped tubes 46 and 47 forming the brake handle 48. Clamp rod 49 is rotatable within the brake handle 48 by the knurled knob 50 at the top, is held in place in the lower casting 44 by the collar 51, and threads into the vertically movable grooved clamp block 52 at the bottom of the rod.

Between said clamp block 52 and guide block 53 held by pin 54 and cotter pin 55 in the cavity 56, in the lower casting 44 is the quadrant 57, comprising a semi-arcuate lunate segment or sector made somewhat wider at the top by locating the center point of the upper edge radius slightly above that of the lower edge radius, the axis of the rocker shaft 42 being taken as the center point for said lower edge radius, said quadrant being anchored to frame 58 at the bottom by pin 59 and provided with the stop 60.

In operation, the brakes are set by pushing the brake lever 43 downward toward the narrow end of the quadrant 57, and the clamp block 52 is frictionally locked against said quadrant 57 by rotative manipulation of the clamp rod 49 threaded thereinto. Said clamp rod 49 when thus threadedly engaged in said clamp block 52 reacts through the collar 51 against the fixed annular top portion 45 of the brake lever casting 44 which reaction transmitted through said clamp block 52 and quadrant 57 is resisted by the guide block 53.

The increasing width of the quadrant 57 effectively prevents any upward slippage of the brake lever 43 from cable pull on the brake rigging, since such slippage is not possible without shearing considerable metal from the quadrant.

The clamp block 52 may also be set with the brake lever 43 in a position permitting the drum 2 to rotate at a specified rate. To halt the movement temporarily, the brake lever 43 need only be pressed down without changing the clamp adjustment. When ready to resume rotation, merely releasing the lever will cause it to return to its previous setting.

Although I have hereinabove described my invention in a good deal of detail, I do not wish to be limited narrowly to the exact and specific design and construction disclosed, but may use such substitutes, modifications, or equivalents as are embraced within the scope and spirit of my invention or pointed out in the claims.

Having thus described my invention, what I claim as new and useful and desire to secure by Letters Patent is:

1. In a device of the class described, the combination of a supporting frame, a lever pivotally mounted thereon, a quadrant fixed to the frame adjacent said lever having its inner and outer edges generated on radii about different centers, a clutching mechanism carried by said lever to engage both edges of said quadrant at any desired point, and means carried by said lever for controlling said clutching means.

2. In a device of the class described, the combination of a hollow handle, a bottom-threaded spindle rotatable in said handle, a collar on said spindle bearing against said handle, a clamp block threaded onto the bottom of said spindle, and a crescentiform segment wedgingly engageable beneath said clamp block.

3. In a device of the class described, the combination of an upright fixed quadrant, a lever having a quadrant-receiving opening, a movable clamping block in said quadrant-receiving opening having a friction portion in cooperative relation with the upper surface of said quadrant, a rotatable block-actuating member adapted to move said clamping block into and out of gripping relation to said quadrant, and a guide block adapted for engaging with the lower surface of said quadrant to receive the thrust of said clamping block.

4. A braking device comprising a base member, a stationary quadrant mounted thereon the generating radii of whose inner and outer edges are on different center points, a rocker shaft pivotally mounted on said base member beneath the quadrant, a brake lever secured to said rocker shaft, clamping means on the brake lever frictionally engageable with the edges of the quadrant, and releasable rotating means for actuating the clamping means.

5. A braking device comprising a supporting member, a quadrant having a wedge-shaped curved arm on the supporting member, a hand lever pivoted to the supporting member at the center of the radius of the lower edge of said curved arm, a locking member movable within said hand lever engageable with the curved arm of said quadrant, and means for actuating and releasing said locking member manually.

6. A braking device comprising, in combination, a crescentiform holding segment, a pivoted lever member astraddle the segment having an annular fixed upper portion, a tubular handle secured above the annular portion to the lever member, a knurled knob upon the tubular handle, an end-threaded clamp rod secured to and rotatable by the knurled knob, a collar on the clamp rod for engaging the annular portion of the lever member, a screw-tapped clamp block movable in the lever member by rotation of the end-threaded clamp rod into gripping engagement with the segment, and a guide block secured beneath the segment to the lever member and cooperating with the clamp block.

HARVEY ELLIS DAVIDSON.